(No Model.)

W. D. SANDWELL.
ELECTRIC MOTOR FOR TRAMWAY VEHICLES

No. 401,970. Patented Apr. 23, 1889.

Witnesses.

Inventor.

(No Model.) 5 Sheets—Sheet 4.
W. D. SANDWELL.
ELECTRIC MOTOR FOR TRAMWAY VEHICLES.

No. 401,970. Patented Apr. 23, 1889.

Witnesses. Inventor,
John E. Bousfield. W. D. Sandwell (No Model.) 5 Sheets—Sheet 5.

W. D. SANDWELL.
ELECTRIC MOTOR FOR TRAMWAY VEHICLES.

No. 401,970. Patented Apr. 23, 1889.

Witnesses.
John Bousfield,

Inventor.
W D Sandwell

UNITED STATES PATENT OFFICE.

WILLIAM D. SANDWELL, OF LONDON, ENGLAND.

ELECTRIC MOTOR FOR TRAMWAY-VEHICLES.

SPECIFICATION forming part of Letters Patent No. 401,970, dated April 23, 1889.

Application filed March 22, 1888. Serial No. 268,123. (No model.)

*To all whom it may concern:*

Be it known that I, WILLIAM DANTON SANDWELL, a subject of the Queen of Great Britian, residing at London, England, have invented new and useful Improvements in Electric Motors for Driving Tramway-Vehicles, of which the following is a specification.

My invention relates to electric motors for driving tram-cars.

In using an electric motor it is well-known that after a time the armature will become heated. For this reason two machines are frequently employed, so that after the armature of one machine has become heated it may be allowed to stand while it cools, the other machine being employed in the meantime. This arrangement has the defects that it is very expensive and that the machines are very heavy, which latter defect, when the motors are applied to tramway-vehicles, is a great disadvantage.

The object of my present invention is to obtain all the advantages of two machines at a lower cost and with less weight than heretofore; and to this end my said invention comprises the improvements hereinafter described.

According to my said invention I employ two armatures in combination with one set of field-magnets, so that after one armature is heated it can be replaced by the other. In practice I find it very advantageous to move the magnets relatively to the armatures; but it is obvious that I can also move the armatures relatively to the magnets. The magnets or the armatures may be moved by any suitable means—for instance, by screw-gearing or by racks and pinions.

In addition to the advantages hereinbefore mentioned the present invention possesses the further advantage that the armature which is not in use is not inclosed within the field-magnets, so that the air is free to circulate around the same, whereby the cooling takes place more rapidly than would otherwise be the case.

To enable my invention to be clearly understood, I will describe how it may be carried into practice by reference to the accompanying drawings, in which—

Figure 1:
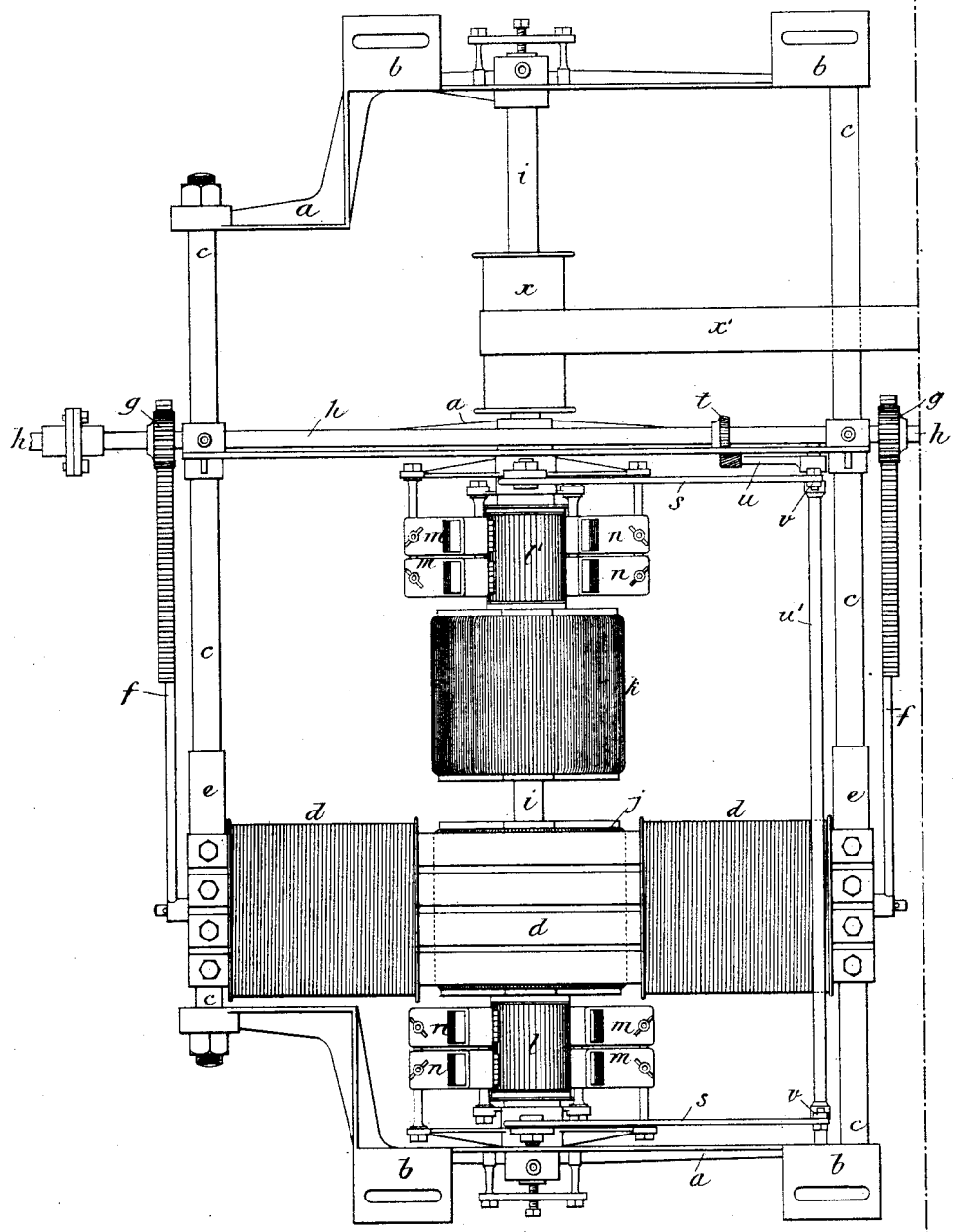
Figure 2:
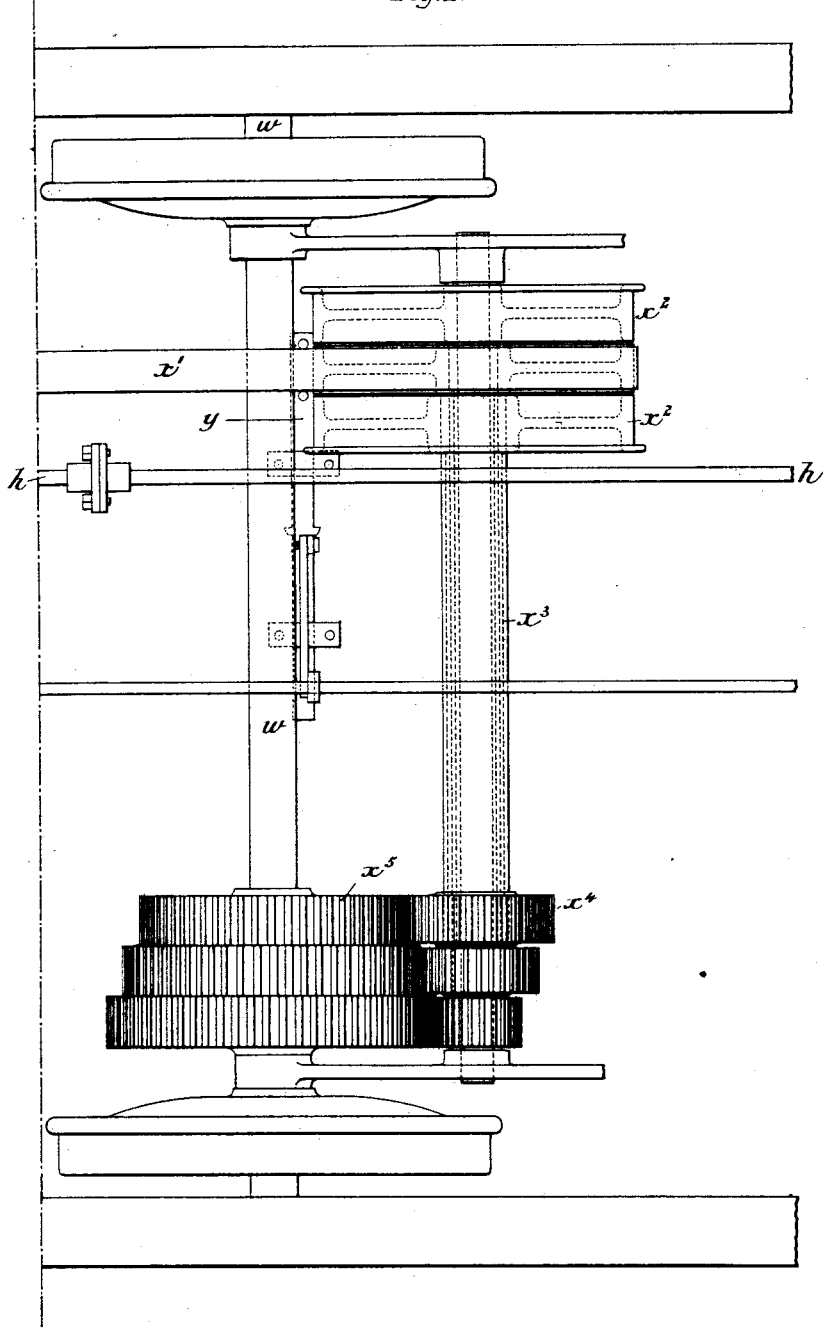
Figure 3:
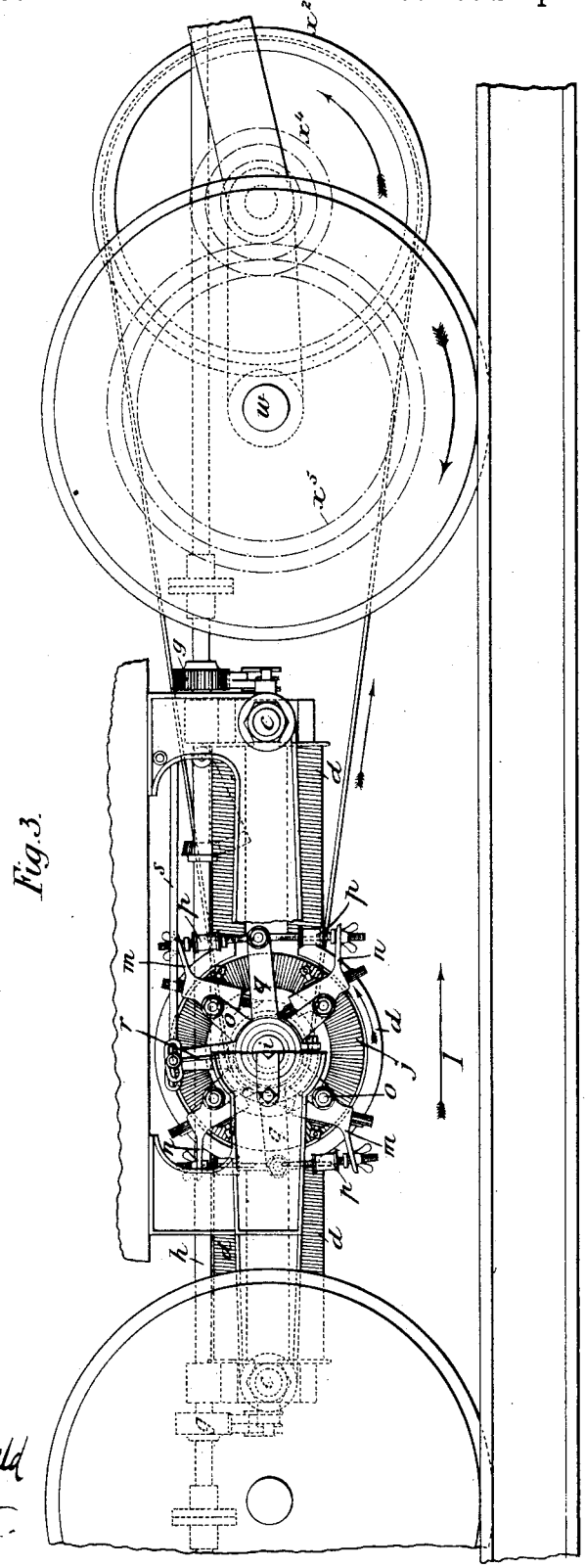
Figure 4:
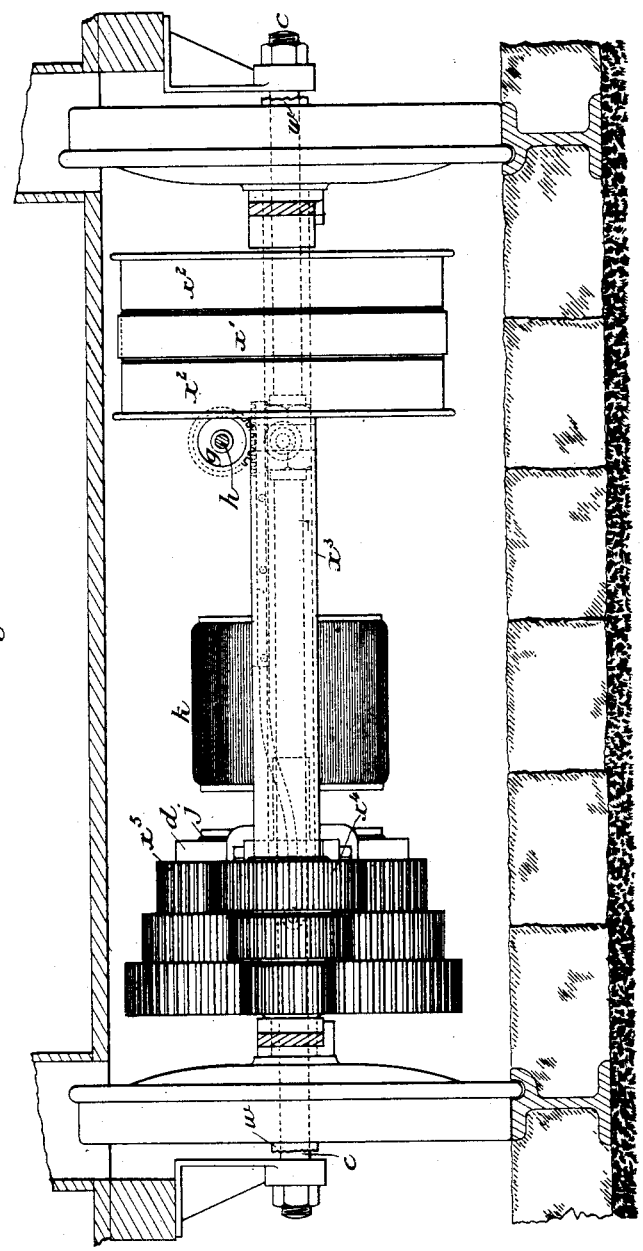
Figure 5:
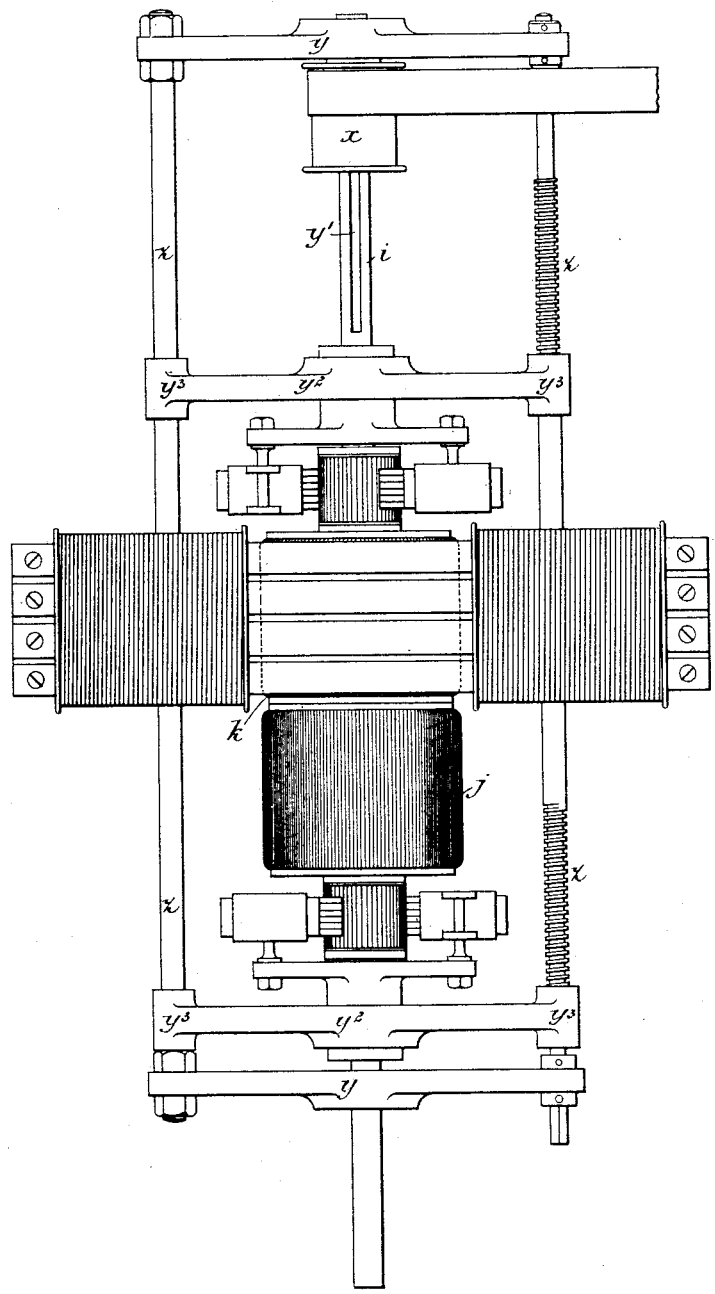

Figure 1 is a plan of a motor adapted to be applied to a tramway-vehicle for driving the same; and Fig. 2 is a plan of mechanism through the medium of which the power of the motor is communicated to one of the axles of the vehicle, the said figure forming a continuation of Fig. 1 from the dotted line. Fig. 3 is a sectional side elevation of the mechanism shown in Figs. 1 and 2, and Fig. 4 is an end view of the same. Fig. 5 is a plan view illustrating the modification of my invention, wherein the armatures are adapted to be moved relatively to the field-magnets.

Referring to Figs. 1 and 4, $a$ is the frame of the motor, which frame has upwardly-extending brackets $b$ (by means of which the motor can be suspended from the floor of a tramway-vehicle, as shown in Fig. 3) and slide-bars $c$.

$d$ $d$ are the field-magnets, which at their ends are provided with sockets $e$, adapted to slide upon the bars $c$, and $f$ $f$ are rack-bars, which are connected with the said field-magnets and in engagement with rack-pinions $g$ $g$ on a shaft, $h$, so that when the said shaft is rotated the field-magnets can be caused to slide upon the bars $c$ in one or other direction, as desired.

$i$ is the armature-shaft, which carries two armatures, $j$ $k$, the said shaft being supported in bearings in the frame $a$.

$l$ $l'$ are the commutators of the armatures $j$ $k$, respectively, and $m$ $m$ $n$ $n$ are sets of brushes adapted to bear upon the same, the brushes $m$ $m$ being designed to make contact with their respective commutators when the armatures are rotating in one direction and the brushes $n$ $n$ when they are rotating in the opposite direction.

It will be noticed that each commutator has two sets of brushes in connection with it. In practice, however, I prefer to use one armature when traveling in one direction and the other when traveling in the opposite direction—for instance, the armature $j$ when moving in the direction of the arrow 1, Fig. 3, and the armature $k$ when moving in the opposite direction. In this case the brushes $n$ $n$ of the commutator $l$ and the brushes $m$ $m$ of the commutator $l'$ can be drawn back within their holders. In case, however, that either armature becomes incapacitated the provision of two sets of brushes enables the remaining armature to be used for traveling in both directions. In order to allow of placing one or other of the sets of brushes in contact with the commutators, as desired, the brushes $m\ m\ n\ n$ of each commutator are mounted upon a four-armed bracket, $o$, fixed to the frame of the machine, and extensions on the brush-carriers are connected by links $p\ p$ to two arms, $q\ q$, of a three-armed lever having a slight rotary movement relatively to the shaft $i$. The other arm, $r$, of the said three-armed lever is connected with a rod, $s$, through the medium of which the three-armed lever can be moved. When the rod $s$ is moved in one direction, the brush-carriers and their brushes are caused to oscillate upon their pivots, thus moving one set of brushes into contact with the commutator and the other set out of contact, and vice versa.

The movement of the three-armed lever may be produced by any desirable means. As shown in the drawings, however, the movement is effected automatically at the same time that the field-magnets are being moved from one armature to the other. The movement in this case is effected through the medium of a pinion, $t$, engaging with the tooth-sector $u$, secured to a shaft, $u'$, upon which are fixed two levers, $v$, attached at their free ends to the rods $s\ s$ of the respective commutators.

The movement of the armature-shaft, as shown in the drawings, is communicated to the axle $w$ of the vehicle through the medium of the pulley $x$, the belt $x'$, the pulleys $x^2$, the shafts $x^3$, and the gear-wheels $x^4$ engaging with other gear-wheels, $x^5$, on the axle $w$. These constructions form the subject-matter of another application, filed February 13, 1889, Serial No. 299,744, in which they are particularly described and claimed.

In Figs. 2 and 4 I have shown three sets of gear-wheels, $x^4\ x^5$, for enabling the motor to be run at a uniform speed notwithstanding the varying grades and curves of the road, whereby the efficiency of the motor is maintained. Each gear-wheel $x^4$ is mounted upon a separate shaft, $x^3$, the three shafts $x^3$ being arranged one within the other, and each carrying a pulley, $x^2$, over either of which the belt can run according to the desired speed of the car relatively to the motor.

$y$ is a belt-shipper, by means of which the belt can be placed upon either pulley, as required.

The modification of my invention wherein the armatures and their shaft are movable relatively to the field-magnets is illustrated in Fig. 5. In this figure the armature-shaft $i$ is supported in bearings in the brackets $y$, and is connected with the driving-pulley $x$ by means of a spline-joint, $y'$. The armatures $j$ $k$ are mounted in a sliding frame, $y^2$, having the extensions $y^3$, which slide upon the rods $z\ z$. One of these rods is screw-threaded, so that by rotating the same the sliding frame with the armatures can be moved.

I would observe that I do not confine myself to the employment of any particular constructions of armature and field-magnets, as such constructions may be varied as desired.

Having now particularly described and ascertained the nature of my said invention and in what manner the same is to be performed, I declare that what I claim is—

1. The combination, with a tram-car, of an electric motor operatively connected therewith, consisting of field-magnets and two armatures, the said magnets and armatures being movable the one with relation to the other, whereby a movement of magnets or armatures reverses the direction of rotation of the armatures, substantially as described.

2. The combination, with a tram-car, of an electric motor operatively connected therewith, consisting of two armatures and field-magnets movable with relation thereto, a commutator for each of said armatures, movable brushes for said commutators, and a connection between said brushes and said magnets, whereby a movement of said magnets reverses the direction of rotation of said armatures, substantially as described.

3. In an electric motor, the combination, with two revoluble armatures, each provided with a commutator and movable brushes for said commutator, of the movable field-magnets, a shaft and connections between the same and said movable field-magnets, and connections between said shaft and said movable commutator-brushes, whereby a movement of said shaft effects a movement of said field-magnets and commutator-brushes, substantially as described.

4. In an electric motor, the combination, with two revoluble armatures, each provided with a commutator and movable brushes for said commutators, of movable field-magnets provided with rack-bars, a shaft provided with pinions engaging said rack-bars, a rock-shaft provided with a segment and connected with said movable brushes, and a pinion on said shaft engaging said segment, substantially as described.

5. In an electric motor having field-magnets and two armatures, said field-magnets and armatures being the one movable in relation to the other, combined with two commutators, each having two sets of brushes, one set adapted to move the motor in one direction and the other set in the opposite direction, said brushes being movable into and out of position, substantially as described.

W. D. SANDWELL.

Witnesses:
JOHN E. BOUSFIELD,
A. L. ALBUTT.